United States Patent [19]
Zeien

[11] Patent Number: 5,581,352
[45] Date of Patent: Dec. 3, 1996

[54] PHASE SHIFTING DEVICE WITH SELECTIVELY ACTIVATED GRATING GENERATOR

[76] Inventor: Robert Zeien, 150T Executive Dr., Edgewood, N.Y. 11717

[21] Appl. No.: 394,876

[22] Filed: Feb. 27, 1995

Related U.S. Application Data

[63] Continuation-in-part of Ser. No. 310,491, Sep. 22, 1994, Pat. No. 5,471,308.
[51] Int. Cl.⁶ ................................................. G01B 11/24
[52] U.S. Cl. ................. 356/376; 250/559.22; 250/237 G
[58] Field of Search ................................... 356/371, 376; 250/559.22, 237 G

[56] References Cited

U.S. PATENT DOCUMENTS

| | | | |
|---|---|---|---|
| 4,641,972 | 2/1987 | Halioua et al. | 356/376 |
| 4,837,732 | 6/1989 | Brandestini et al. | 356/376 |
| 4,984,893 | 1/1991 | Lange | 356/376 |
| 5,175,601 | 12/1992 | Fitts | 356/376 |
| 5,450,204 | 9/1995 | Shigeyama et al. | 356/376 |

*Primary Examiner*—F. L. Evans
*Attorney, Agent, or Firm*—Kenyon & Kenyon

[57] ABSTRACT

The invention provides a device for shifting the phase of a projected grating by use of a grating generator comprising one or more clear substrates having a plurality of equally-spaced, equal width bands of liquid crystal. The liquid crystal bands are selectively activated to modulate, that is, to shift, the phase of the projection of the grating on a test surface.

19 Claims, 2 Drawing Sheets

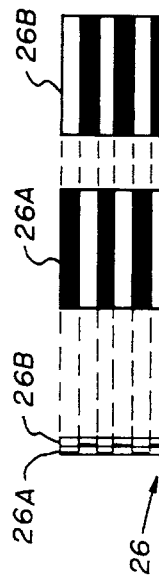

5,581,352

PHASE SHIFTING DEVICE WITH SELECTIVELY ACTIVATED GRATING GENERATOR

BACKGROUND OF THE INVENTION

This application is a continuation-in-part of copending U.S. patent application Ser. No. 08/310,491 filed Sep. 22, 1994, now U.S. Pat. No. 5,471,308.

This invention relates to phase shifting mechanisms and particularly to a phase shifting mechanism for projected fringe contouring devices.

Surface profile measuring by means of non-contact optical methods are widely used in a variety of fields including medicine and human modeling applications.

U.S. Pat. No. 4,984,893 issued to Steven R. Lange on Jan. 15, 1991 and entitled "Phase Shifting Device and Method" discloses a phase shifting device for producing transverse shifts of a projected grating. In that patent, the phase shift is accomplished by use of a flat transparent glass plate which is rotatable about an axis generally parallel to the lines of the grating. The transparent glass plate is rotated through a plurality of selected angles to provide modulation of the phase of the grating projected on the test surface.

While the device disclosed in that patent accomplishes its intended purpose, it is relatively costly as it requires the use of an expensive step motor and related controller to rotate the plate. In addition, the time necessary for the motor to rotate between the desired angles is substantial and increases the time necessary to complete each cycle of the imaging process.

SUMMARY OF THE INVENTION

It is an object of the present invention to provide an inexpensive, simple device for producing phase shifts of a projected grating, the device requiring no moving parts.

It is a further object of this invention provide precise predetermined phase shifts of a projected grating without the necessity of critical calibration requirements.

It is a further object of this invention to provide a device for precise predetermined phase shifts of a projected grating which does not require recalibration or readjustment during normal field operations.

It is a further object of this invention to provide a device for precise predetermined phase shifts of a projected grating in which the amounts of the phase shifts are predetermined and cannot be inadvertently changed.

The invention provides a device for shifting the phase of a projected grating by use of a grating generator comprising one or more clear substrates having a plurality of equally-spaced, equal width bands of liquid crystal. The liquid crystal bands are selectively activated to modulate, that is, to shift, the phase of the projection of the grating on a test surface.

BRIEF DESCRIPTION OF THE DRAWINGS

FIG. 4 illustrates the intensity pattern of light projected when the projected grating is in focus and when the projected grating is defocused.

FIG. 5A illustrates an embodiment of a grating generator according to the invention having two substrate layers.

FIG. 5B illustrates the phase shift generated using the embodiment of FIG. 5A.

FIG. 6A illustrates an embodiment of a grating generator according to the invention having four substrate layers.

FIG. 6B illustrates the phase shift generated using the embodiment of FIG. 6A.

FIG. 7A illustrates an embodiment of a grating generator according to the invention having six substrate layers.

FIG. 7B illustrates the phase shift generated using the embodiment of FIG. 7A.

DETAILED DESCRIPTION OF THE DRAWINGS

Figure 1:
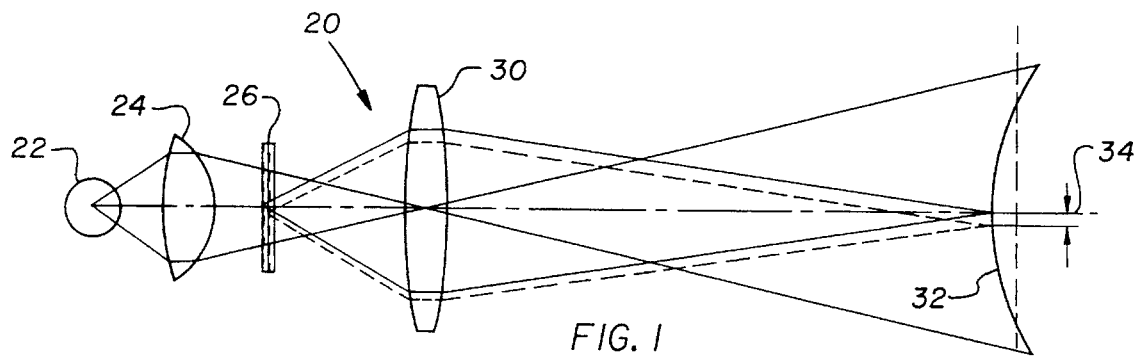
FIG. 1 is a schematic diagram of a phase shifting projector embodying the present invention.
Figure 2:
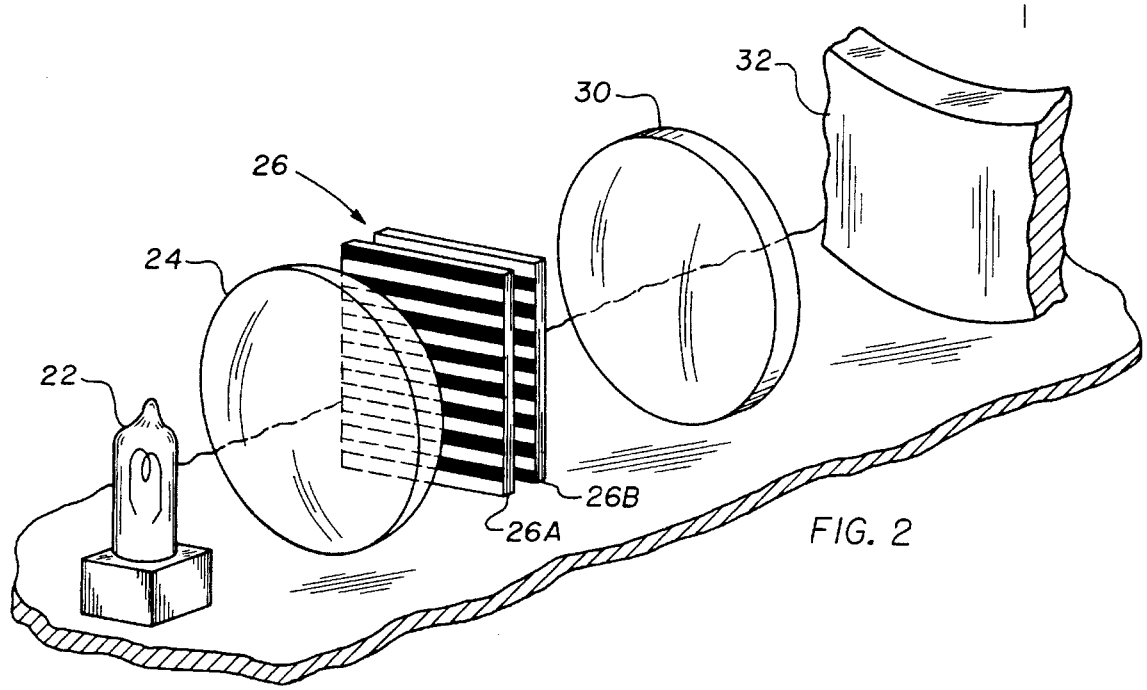
FIG. 2 is a perspective diagrammatic view of the phase shifting projector of FIG. 1 with parts broken away.

Referring now to the drawings and particularly FIG. 1 and FIG. 2, a phase shifting projector 20 is shown including a suitable light source 22, which may be an incandescent lamp, a condensing lens 24, a grating generator 26, and a projecting lens 30. A spherical test surface 32 is positioned on the axis 34, along which all elements are optically aligned. While the test surface 32 shown is spherical, it will be understood that it can, and usually will, be an irregular shape. Although not shown herein, a heat absorbing filter may be positioned between the light source and the rest of the system to prevent heat damage to the components.

The grating generator 26 comprises two clear substrates 26A, 26B each having a plurality of equally-spaced, equal width bands of liquid crystal. The spacing between the bands is equal to the width of the bands. For purposes of illustration, the liquid crystal on each substrate is shown in the activated or "on " condition, to show the relative positions of the bands.

In operation of the grating generator 26, the bands of liquid crystal are activated on only one of the substrates at a time. That is, when the bands on one substrate are activated, the bands on the other substrate are not. Thus, the substrate with the activated bands forms a grating having opaque bands of activated liquid crystal, while the substrate with the non-activated bands is translucent throughout.

When the liquid crystal bands on only one of the substrates are activated and the projected grating is focused on the test surface, the light passing through the grating generator produces a projected grating on the test surface with an intensity pattern of a square wave. The grating may also be defocused so that the projected grating has an intensity pattern approaching a sinusoidal pattern. These alternative patterns are illustrated in FIG. 4. In the illustrated embodiments of FIGS. 5–7, a projected sinusoidal grating (i.e., defocused grating) is utilized.

In operation of the phase shifting projector 20, light from the light source 22 first passes through the condensing lens 24 and then through the grating generator 26, which in the illustrated embodiment is disposed normal to the optical axis 34. The light then passes through the projecting lens 30 and onto the test surface 32. Thus, image rays from the grating generator 26 pass through the projection lens 30 to project an image of the grating on the test surface 32. The image on the test surface 32, when viewed at an angle from the optical axis of the system, will be a deformed projection of the grating and will form the basis for measuring the test surface.

To measure the test surface, the liquid crystal bands on the substrates 26A, 26B are selectively activated to modulate, that is, to shift, the phase of the projected sinusoidal image on the test surface. The phase of the projected sinusoidal image is shifted by deactivating the liquid crystal bands on one substrate and activating the liquid crystal bands on the other substrate.

This phase shift is illustrated in FIGS. 5A and 5B. In FIG. 5A, the two substrates 26A and 26B are shown. The left side of FIG. 5A shows a side view of the grating generator 26 with the two substrate layers 26A and 26B, while the right side of FIG. 5A shows front views of each of the substrates in order to illustrate the relative positions of the liquid crystal bands. For purposes of illustration, both substrates are shown with the liquid crystal bands activated, although in operation the liquid crystal bands on only one of the substrates will be activated at a time.

The liquid crystal bands on the substrate 26B are staggered from the liquid crystal bands on the substrate 26A by an amount equal to the width of one band. When the liquid crystal bands of the substrate 26A are activated (and the liquid crystal bands of the substrate 26B are not), the projected sinusoidal grating has the pattern 28A as shown in FIG. 5B. When those bands are deactivated and the liquid crystal bands of the substrate 26B are activated, the projected sinusoidal grating has the pattern 28B as shown in FIG. 5B. By virtue of the offset of the bands on substrate 26B with respect to those on substrate 26A, the resulting phase shift is equal to one-half the wavelength ($\pi$).

Alternative embodiments of grating generators for use with the phase shifting projector of the present invention are illustrated in FIGS. 6A and 7A. In FIG. 6A, a grating generator 36 is shown, having four substrates 36A, 36B, 36C, 36D with equally-spaced equal width liquid crystal bands. The left side of FIG. 6A shows a side view of the grating generator 36, while the right side shows front views of each of the substrates in order to illustrate the relative positions of the liquid crystal bands. Again, for purposes of illustration only, each of the substrates is shown with the liquid crystal bands activated.

In the embodiment of FIG. 6A, the liquid crystal bands on each of the substrates are offset from those on the previous substrate by an amount equal to one-third the width of one band. When the liquid crystal bands of the substrate 36A are activated (and the liquid crystal bands of the substrates 36B, 36C, 36D are not), the projected sinusoidal grating has the pattern 38A as shown in FIG. 6B. When those bands are deactivated and the liquid crystal bands of the substrate 36B are activated, the projected sinusoidal grating has the pattern 38B as shown in FIG. 6B. By virtue of the offset of the bands on substrate 36B with respect to those on substrate 36A, the resulting phase shift is equal to one-sixth the wavelength ($\pi/3$). Successive activation of the liquid crystal bands of substrates 36C and 36D (and corresponding deactivation of the bands on the other substrates) results in the patterns 38C and 38D respectively, with further phase shifts of $\pi/3$ during each successive activation.

In FIG. 7A, a grating generator 40 is shown, having six substrates 40A, 40B, 40C, 40D, 40E, 40F with equally-spaced equal width liquid crystal bands. As with FIGS. 5A and 6A, the left side of FIG. 7A shows a side view of the grating generator, and the right side shows front views of each of the substrates, showing the activated positions of the liquid crystal bands for illustration purposes.

In the embodiment of FIG. 7A, the liquid crystal bands on each of the substrates are offset from those on the previous substrate by an amount equal to one-fifth the width of one band. Thus, the substrates generate the patterns 42A, 42B, 42C, 42D, 42E, 42F in FIG. 7B. By virtue of the offset of the bands, the resulting phase shift from activation of the bands on each successive substrate is equal to one-tenth the wavelength ($\pi/5$).

It will be appreciated to those skilled in the art that the embodiments of FIGS. 5A, 6A and 7A are merely illustrative of numerous embodiments of possible configurations of grating generators within the scope of the present invention. For example, the grating generator may have any number of substrate layers and, for example, may only have one substrate layer with different sets of bands that can be alternately activated. For example, two sets of bands offset by the width of one band (as in the embodiment of FIG. 5A) may be included together on a single substrate and selectively activated.

In alternative embodiments, the offsets of the different sets of bands may be different from the examples given above, and the activation sequences may also vary within the scope of the present invention. If desired, embodiments may be constructed in which the liquid crystal bands on two or more substrates are activated simultaneously or in which two or more sets of bands on the same substrate are activated simultaneously.

Figure 3:
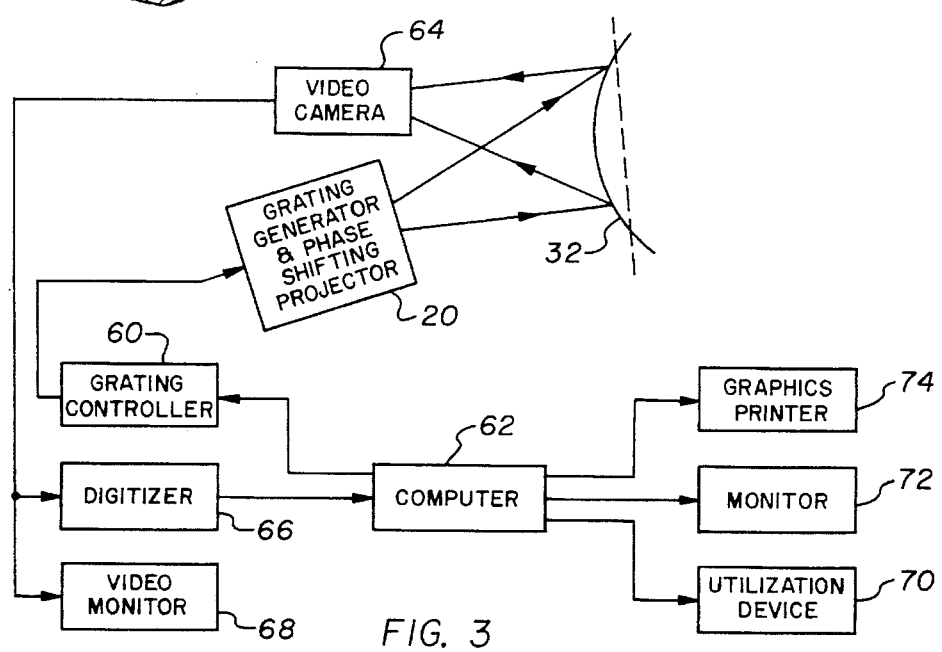
FIG. 3 is a block diagram of a projected fringe contouring system utilizing the phase shifting projector of FIG. 1.

Referring now to FIG. 3, there is shown in schematic form an optical measuring system incorporating the phase shifting projector 20 shown in FIG. 1. The system shown in FIG. 3 is representative of the types of systems which may utilize the invention shown herein and is shown for illustrative purposes. The other individual components and the general arrangement are well known to those skilled in the art.

The phase shifting projector 20 receives signals from a grating controller 60 connected to a computer 62 and projects a grating pattern on a test surface 32. A video camera 64 views the image produced on the test surface 32 and generates an analog signal which is encoded by the digitizer 66 and transmitted to the computer 62. A video monitor 68 allows direct viewing of the video camera output. The output signal from the computer 62 is supplied to a utilization device 70 which utilizes the output signal. The output signal may also be supplied to other devices such as a monitor 72 and a graphics printer 74.

What is claimed is:

1. The phase shifting projector comprising:

a. a light source;

b. a condensing lens receiving light from the light source;

c. a projecting lens; and d. a grating generator positioned between the condensing lens the projecting lens, the grating generator comprising at least first and second transparent substrates, wherein a first set of bands is located on the first transparent substrate and a second set of bands si located on the second transparent substrate, wherein each set of bands may be selectively, changed between a first condition in which the bands of the set are opaque and a second condition in which the bands of the set are transparent, and wherein the sets of bands may be be selectively operated in order to shift the phase of an image of the grating generator projected on atest surface.

2. The phase shifting projector of claim 7, wherein each of the first and second sets of bands comprises equally-spaced equal width bands of liquid crystal, the spacing between the bands being equal to the width of the bands.

3. The phase shifting projector of claim 2, wherein the bands of the second set of bands are offset from the bands of the first set of bands by a distance equal to the width of one band, so that changing the first set from the first condition to the second condition and changing the second set from the second condition to the first condition results in a shift by $\pi$ of the phase of the image of the grating generator projected on a test surface.

4. The phase shifting projector of claim 1, wherein the projecting lens and grating generator are positioned so that the image of the grating generator projected on the test surface approximates a sine wave.

5. The phase shifting projector of claim 4, wherein each of the first and second sets of bands comprises equally-spaced equal width bands of liquid crystal, the spacing between the bands being equal to the width of the bands.

6. The phase shifting projector of claim 5, wherein the bands of the second set of bands are offset from the bands of the first set of bands by a distance equal to the width of one band, so that changing the first set from the first condition to the second condition and changing the second set from the second condition to the first condition results in a shift by $\pi$ of the phase of the image of the grating generator projected on a test surface.

7. The phase shifting projector of claim 1, wherein the bands of the second set of bands are offset from the bands of the first set of bands by a distance equal to the width of one band, so that changing the first set from the first condition to the second condition and changing the second set from the second condition to the first condition results in a shift by $\pi$ of the phase of the image of the grating generator projected on a test surface.

8. The phase shifting projector of claim 1, wherein the grating generator further comprises third and fourth transparent substrates, and wherein a the third set of bands is located on the third transparent substrate and a fourth set of bands is located on the fourth transparent substrate.

9. The phase shifting projector of claim 8, wherein the bands of the second set of bands are offset from the bands of the first set of bands by a distance equal to one-third the width of one band, so that changing the first set from the first condition to the second condition and changing the second set from the second condition to the first condition results in a shift by $\pi/3$ of the phase of the image of the grating generator projected on a test surface.

10. The phase shifting projector of claim 8, wherein the grating generator further comprises fifth and sixth transparent substrates. wherein a fifth set of bands is located on the fifth transparent substrate and a sixth set of bands is located on the sixth transparent substrate.

11. The phase shifting projector of claim 10, wherein the bands of the second set of bands are offset from the bands of the first set of bands by a distance equal to one-fifth the width of one band, so that changing the first set from the first condition to the second condition and changing the second set from the second condition to the first condition results in a shift by $\pi/5$ of the phase of the image of the grating generator projected on a test surface.

12. A grating generator for a phase shifting projector, the grating generator comprising at least first and second transparent substrates, wherein a first set of bands is located on the first transparent substrate and a second set of bands is located on the second transparent substrate, wherein each of the first and second sets of bands may be selectively changed between a first condition in which the bands of the set are opaque and a second condition in which the bands of the set are transparent, and wherein the first and second sets of bands may be selectively operated in order to shift the phase of an imaqe of the grating generator projected on a test surface.

13. The grating generator of claim 12, wherein each of the first and second sets of bands comprises eually-spaced equal width bands of liquid crystal, the spacing between the bands being equal to the width of the bands.

14. The grating generator of claim 13, wherein the bands of the second set of bands are offset from the bands of the first set of bands by a distance equal to the width of one band, so that changing the first set from the first condition to the second condition and changing the second set from the second condition to the first condition results in a shift by $\pi$ of the phase of the image of the grating generator projected on a test surface.

15. The grating generator of claim 12, wherein the bands of the second set of bands are offset from the bands of the first set of bands by a distance equal to the width of one band, so that changing the first set from the first condition to the second condition and changing the second set from the second condition to the first condition results in a shift by $\pi$ of the phase of the image of the grating generator projected on a test surface.

16. The grating generator of claim 12, wherein the grating generator further comprises third and fourth transparent substrates, wherein a third set of bands is located on the third transparent substrate and a fourth set of bands is located on the fourth transparent substrate.

17. The grating generator of claim 16, wherein the bands of the second set of bands are offset from the bands of the first set of bands by a distance equal to one-third the width of one band, so that changing the first set from the first condition to the second condition and changing the second set from the second condition to the first condition results in a shift by $\pi/3$ of the phase of the image of the grating generator projected on a test surface.

18. The grating generator of claim 16, wherein the grating generator further comprises fifth and sixth transparent substrates, wherein a fifth set of bands is located on the fifth transparent substrate and sixth set of bands is located on the sixth transparent substrate.

19. The grating generator of claim 18, wherein the bands of the second set of bands are offset from the bands of the first set of bands by a distance equal to one-fifth the width of one band, so that change the first set from the first condition to the second condition and change the second set from the second condition to the first condition results in a shifts by $\pi/5$ the phase of the image of the grating generator projected on a test surface.

* * * * *

UNITED STATES PATENT AND TRADEMARK OFFICE
CERTIFICATE OF CORRECTION

PATENT NO. : 5,581,352
DATED : Dec. 3, 1996
INVENTOR(S) : Robert ZEIEN

It is certified that error appears in the above-indentified patent and that said Letters Patent is hereby corrected as shown below:

In the Claims:

Claim 1, line 44, change "The" to --A--.

Claim 1, line 50, after "lens", first instance, insert --and--.

Claim 1, line 53, change "si" to --is--.

Claim 1, line 61, change "atest" to --a test--.

Claim 2, line 62, change "7" to --1--.

Claim 8, line 33, delete the words "and" and "the".

Claim 12, line 9, change "imaque" to --image--.

Claim 13, line 12, change "eually-spaced" to --equally-spaced--.

UNITED STATES PATENT AND TRADEMARK OFFICE
CERTIFICATE OF CORRECTION

PATENT NO. : 5,581,352
DATED : Dec. 3, 1996
INVENTOR(S) : Robert ZEIEN

It is certified that error appears in the above-indentified patent and that said Letters Patent is hereby corrected as shown below:

In the Claims:

Claim 19, lines 52-53, delete "change" and insert
--changing--.

Claim 19, line 55, after "π/5" and before "the", insert
--of--.

Signed and Sealed this

Twenty-fifth Day of February, 1997

Attest:

BRUCE LEHMAN

Attesting Officer

Commissioner of Patents and Trademarks